United States Patent
Devarayanigari et al.

(10) Patent No.: US 9,794,751 B1
(45) Date of Patent: Oct. 17, 2017

(54) METHOD FOR AVOIDING RESOURCE WASTAGE WHILE DETECTING LOCATION IDENTIFIERS MISMATCH

(71) Applicant: Samsung Electronics Co., Ltd., Suwon-si, Gyeonggi-do (KR)

(72) Inventors: Pavan Kumar Devarayanigari, Bangalore (IN); Ramkumar Thirumalli Sureshsah, Bangalore (IN); Venkata Anil Kumar Karamsetti, Bangalore (IN)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 15/220,841

(22) Filed: Jul. 27, 2016

(30) Foreign Application Priority Data

Jul. 28, 2015 (IN) .............................. 3872/CHE/2015
Jun. 30, 2016 (IN) .............................. 3872/CHE/2015

(51) Int. Cl.
| | |
|---|---|
| *H04W 24/00* | (2009.01) |
| *H04W 4/02* | (2009.01) |
| *H04L 29/06* | (2006.01) |
| *H04L 12/26* | (2006.01) |
| *H04H 20/38* | (2008.01) |
| *H04W 76/04* | (2009.01) |
| *H04W 88/02* | (2009.01) |
| *H04W 84/04* | (2009.01) |

(52) U.S. Cl.
CPC ............. *H04W 4/023* (2013.01); *H04H 20/38* (2013.01); *H04L 43/16* (2013.01); *H04L 63/0853* (2013.01); *H04W 76/046* (2013.01); *H04W 84/042* (2013.01); *H04W 88/02* (2013.01)

(58) Field of Classification Search
CPC ... H04W 4/023; H04W 76/046; H04W 88/02; H04W 84/042; H04L 63/0853; H04L 43/16; H04H 20/38
USPC .................................. 455/456.6, 456.1, 550.1
See application file for complete search history.

(56) References Cited

U.S. PATENT DOCUMENTS

| 2007/0184834 A1* | 8/2007 | Jeong | H04W 24/08 455/434 |
|---|---|---|---|
| 2009/0017863 A1 | 1/2009 | Rowley et al. | |
| 2010/0322128 A1* | 12/2010 | Becker | H04W 4/08 370/312 |

(Continued)

*Primary Examiner* — Khai M Nguyen
(74) *Attorney, Agent, or Firm* — Harness, Dickey & Pierce, P.L.C.

(57) ABSTRACT

A method implemented by a processor included in a mobile terminal which is configured to communicate with a communication network, including receiving from a network a first location identifier value in broadcast system information, detecting at least one mismatch between the first location identifier value and a second location identifier value, the second location identifier value included in a location update accept message received from the network, incrementing a value of a counter based on the detected at least one mismatch, determining that the value of the counter reaches a threshold, the threshold being a maximum number of the detected at least one mismatch between the first location identifier value and the second location identifier value, and updating the first location identifier value in a Subscriber Identity Module (SIM) may be provided.

20 Claims, 12 Drawing Sheets

(56) References Cited

U.S. PATENT DOCUMENTS

2013/0064176 A1* 3/2013 Hsu .................. H04W 4/02
                                                370/328
2016/0044479 A1* 2/2016 Zhi .................. H04W 4/005
                                                370/328

* cited by examiner

METHOD FOR AVOIDING RESOURCE WASTAGE WHILE DETECTING LOCATION IDENTIFIERS MISMATCH

CROSS-REFERENCE TO RELATED APPLICATIONS

This application claims priority under 35 U.S.C. §119(a) to Indian Provisional Patent Application Serial No. 3872/CHE/2015 (PS), which was filed on Jul. 28, 2015 in the Indian Intellectual Property Office, and to Indian Complete Patent Application Serial No. 3872/CHE/2015 (CS), which was filed on Jun. 30, 2016 in the Indian Intellectual Property Office, the entire disclosure of each of these applications is incorporated herein by reference.

BACKGROUND

Existing systems and methods do not provide information about a mismatch of an identity (e.g., Location Area Identity (LAI)) received in broadcasted system information and an identity received during a registration accept procedure. Thus, behavior of a mobile terminal (e.g., User Equipment (UE) or mobile station) is unpredictable. Further, according to the current specification (or requirements), the mobile terminal should update the LAI value of a Subscriber Identity Module (SIM) with the LAI value received in a Location Area Update (LAU) accept message. However, the current specification does not clearly define how to handle a situation where there is a mismatch in identities values (e.g., LAI values) between the LAU accept message and the broadcasted LAI (e.g., system information block (SIB) information).

If the mobile terminal enters a new location area and receives the LAI value (e.g., LAI-A) in the broadcasted system information, the mobile terminal triggers a LAU request message to a communication network and receives a LAU accept message from the communication network. If the communication network sends different LAI (e.g., LAI-B) in the LAU accept message, the mobile terminal updates the LAI value in the SIM with received LAI value (e.g., LAI-B). After updating the SIM LAI value with the LAI-B value, the mobile terminal will again detect the LAI (e.g., LAI-A) from the broadcasted system information. Further, the mobile terminal detects the LAI change between the LAI value stored in the SIM and the current LAI detected from the broadcasted system information. After detecting the LAI change, the mobile terminal again initiates the LAU procedure. Thus, the LAU procedure can run continuously in a loop, thereby resulting in battery drain in the mobile terminal.

Consider a situation where the mobile terminal is powered ON and a cell search process is completed, and a Non-Access Stratum (NAS) of the mobile terminal receives the LAI-A as the currently camped LAI which is read from the broadcasted system information. In such case, the mobile terminal initiates the LAU procedure and sends the location update request message to the communication network. Based on the location update request message, the communication network sends the LAU accept message with different LAI value (e.g., LAI-B). When the mobile terminal receives the LAU accept message, the mobile terminal updates the LAI value (LAI-A) of SIM with the received LAI value (e.g., LAI-B). Further, a Radio Resource (RR) connection of the mobile terminal is released and the mobile terminal moves to or enters an idle mode. The mobile terminal receives the CELL Index (IND) with LAI-A. Then, the mobile terminal will perform the LAU procedure again of there is a LAI mismatch between the LAI value in the SIM and the broadcasted LAI value. In this case, the mobile terminal can run the LAU procedure repeatedly until the correct LAI value is received in the LAU accept message from the communication network.

Consider another situation where after initial registration procedure is successful on the LAI-A, the mobile terminal is moved to or enters a different location and receives the LAI-B from the broadcasted system information. In such case, the mobile terminal starts the LAU procedure and sends the LAU request to the communication network. The communication network sends the LAU accept message with different LAI value (e.g., LAI-C). When the mobile terminal receives the LAU accept message, the mobile terminal updates the LAI value (e.g., LAI-A) of the SIM with the received LAI value (e.g., LAI-C), and the mobile terminal will remove the LAI-C from a forbidden LAI list, if the LAI-C is present in the forbidden LAI list. After the mobile terminal removes the LAI-C from the forbidden LAI list, the RR connection is released and the mobile terminal moves to or enters the idle mode. If the mobile terminal communicates with the communication network sending the LAI-C and attempts the registration on the forbidden LAI, the mobile terminal receives the rejection message from the communication network.

Consider still another situation where after the initial registration procedure is successful on a Public Land Mobile Communication network-1 (PLMN-1) and the LAC-A, the mobile terminal moves to a different cell and the cell IND is received with the PLMN-1 and the LAI-B. In such case, the mobile terminal initiates the LAU procedure and sends the LAU request to the communication network. The communication network sends the LAU accept message with different LAI value. The different LAI value includes the PLMN-2 along with the LAC-C. When the mobile terminal receives the LAU accept message, the mobile terminal updates the LAI value (e.g., LAI-A) of the SIM with the received LAI value (e.g., LAC-C), and the mobile terminal will remove the PLMN-2 from the forbidden list if the PLMN-2 is present in the forbidden PLMN list. Further, the RR connection is released and the mobile terminal enters the idle mode. If the mobile terminal enters the different cell which is under the PLMN-2, and attempts the LAU procedure on the forbidden cell, the mobile terminal removes the forbidden PLMN from the forbidden PLMN list. When the mobile terminal attempts registration on the forbidden PLMN's, the mobile terminal receives the reject from the cell.

Consider yet another situation where the mobile terminal is registered with the PLMN 1 along with the LAC-A, the communication network sends the PLMN-2 along with the LAC-B in the LAU accept message, and the mobile terminal updates a Registered Public Land Mobile Network (RPLMN) value as PLMN-2 in the SIM. If the mobile terminal is restarted in a power ON mode, then the mobile terminal attempts to register with the PLMN-2 directly even though it is not part of the RPLMN. Further, the location area update procedure will be triggered on the PLMN-2. If the mobile terminal attempts the power ON registration on different PLMN-2, which does not accept the mobile terminal, then the communication network sends a reject message during the registration process.

Considering a situation including dual SIMs where the LAU procedure is repeatedly performed by a first SIM in response to detecting identities mismatch with respect to the LAI value received in the broadcasted system information and a LAI value received in the LAU accept message from the communication network. Then, the second SIM (i.e. SIM2) will not get a chance to perform registration procedure. This can cause the SIM 2 to be in no service condition. Thus, the Mobile Originating (MO) and/or a Mobile Terminating (MT) call to/from the SIM 2 fails.

SUMMARY

Some example embodiments provide methods for storing a location identifier received in broadcasted system information to avoid a state mismatch in a mobile terminal.

Some example embodiments provide methods for detecting a mismatch between a first location identifier value and a second location identifier value, where the first location identifier value is received from a communication network in broadcast system information and the second location identifier value is received from the communication network during a location update procedure.

Some example embodiments provide methods for incrementing value of a counter based on mismatch between the first location identifier value and the second location identifier value.

Some example embodiments provide methods for determining that the value of the counter reaches a threshold.

Some example embodiments provide methods for updating the first location identifier in a SIM.

Some example embodiments provide methods for determining that the second location identifier value is present in a forbidden location identifier list.

Some example embodiments provide methods for determining that the second location identifier value is present in a forbidden PLMN list.

Some example embodiments provide methods of avoiding removal of the second location identifier value in the forbidden location identifiers list.

Some example embodiments provide methods of avoiding removal of the second location identifier in the forbidden PLMN list.

Some example embodiments provide a method for detecting a power off event prior to determining that the value of the counter reaches the threshold and storing the location identifier value received in the broadcast system information.

According to an example embodiment, a method implemented by a processor included in a mobile terminal, which is configured to communicate with a communication network, may include receiving a first location identifier value in broadcast system information from the communication network, detecting at least one mismatch between the first location identifier value and a second location identifier value, the second location identifier value included in a location update accept message received from the communication network, incrementing a value of a counter based on the detected at least one mismatch, determining that the value of the counter reaches a threshold, the threshold being a maximum number of the detected at least one mismatch between the first location identifier value and the second location identifier value, and updating the first location identifier value in a Subscriber Identity Module (SIM).

In some example embodiment, the method may further include, along with the incrementing a value of the counter, storing in the SIM at least one of the first location identifier value or the second location identifier value received from the communication network, determining, by the processor, that the second location identifier value is present in one of a forbidden location identifier list or a forbidden Public Land Mobile Network (PLMN) list, and avoiding, by the processor, removal of the second location identifier value from the one of the forbidden location identifiers list or the forbidden PLMN list.

In some example embodiments, the method may further include, prior to determining that the value of the counter reaches the threshold, detecting, by the processor, a power off event, and adaptively storing, by the processor, the first location identifier value in the SIM In some example embodiments, the updating the first location identifier value in the SIM may include replacing the first location identifier value in the SIM with the second location identifier value after the incrementing a value of the counter.

In some example embodiments, the updating the first identifier value in the SIM may include storing the first identifier value in the SIM when the threshold is 1.

In some example embodiments, the mobile terminal may include a first SIM and a second SIM. The SIM may be the first SIM.

In some example embodiments, each of the first location identifier value and the second location identifier value may be one of a Location Area Identifier (LAI), a Routing Area Identifier (RAI), or a Tracking Area Identifier (TAI).

According to an example embodiment, a mobile terminal may include a memory configured to store computer-readable instructions, and one or more processors configured to execute the computer-readable instructions in communication with a communication network such that the one or more processors are configured to receive a first location identifier value included in broadcast system information from a communication network, detect at least one of mismatch between the first location identifier value and a second location identifier value, the second location identifier value included in a location update accept message received from the communication network, increment a value of a counter based on the detected at least one of mismatch, determine that the value of the counter reaches a threshold, the threshold corresponds being a maximum number of the detected at least one mismatch between the first location identifier value and the second location identifier value, and update the first location identifier in a Subscriber Identity Module (SIM).

According to an example embodiment, a method for a location area identity (LAI) identification implemented by a processor included in a mobile terminal, which is configured to communicate with a communication network may include receiving, by the processor, from a communication network a first location identifier value in broadcast system information, first sending, by the processor, a location update request message to the communication network, first receiving, by the processor, a location update accept message from the communication network, the location update accept message including a second location identifier value, first detecting, by the processor, at least one first mismatch between the first location identifier value and a second location identifier value, incrementing, by the processor, a first value of a counter based on the at least one first mismatch, and updating, by the processor, a location identifier value in a Subscriber Identity Module (SIM) with the second location identifier value.

These and other aspects of example embodiments will be better appreciated and understood when considered in conjunction with the following description and the accompanying drawings. It should be understood, however, that the following descriptions, which describes some example embodiments, are given by way of illustration and not of limitation. Many changes and modifications may be made without departing from the spirit of example embodiments.

BRIEF DESCRIPTION DRAWINGS

Some example embodiments of the inventive concepts are illustrated in the accompanying drawings, in which like reference letters and numerals indicate like parts throughout the various figures. The example embodiments herein will be more clearly understood from the following brief description taken in conjunction with the accompanying drawings, in which.

Figure 7:
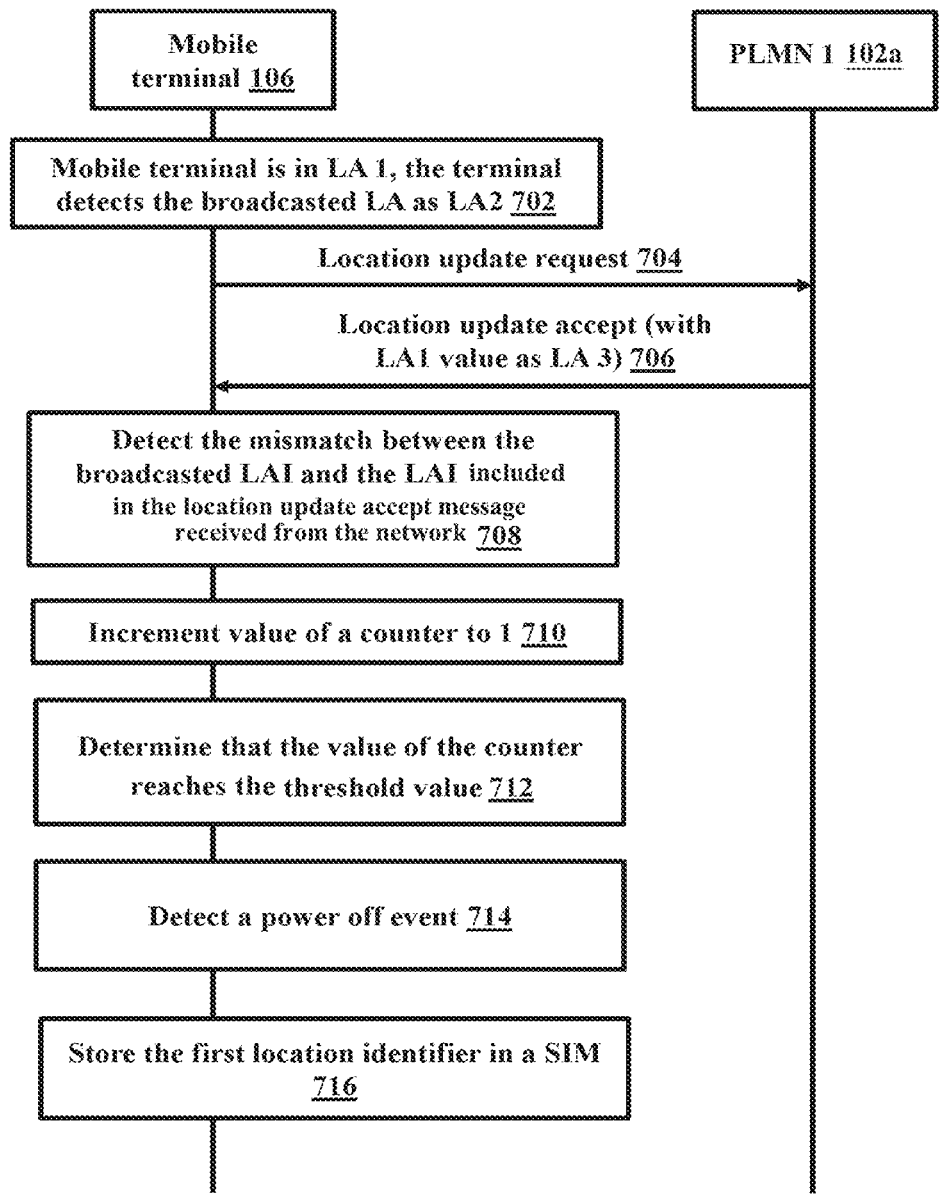
Figure 8:
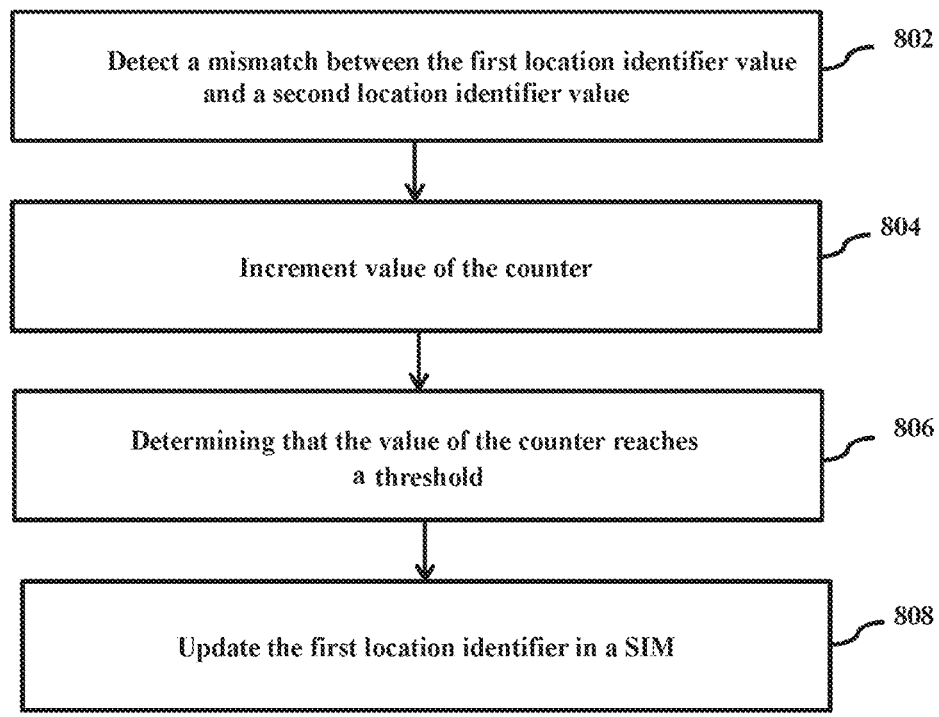

FIG. 7 is a sequence diagram illustrating an operation in a procedure for avoiding the resource wastage when mismatch in location identifier values is detected and the mobile terminal detects a power off event prior to determining that the value of the counter reaches the predefined threshold, according to an example embodiment; and FIG. 8 is a flow diagram illustrating a method for avoiding the resource wastage when mismatch in location identifier values is detected, according to an example embodiment.

Figure 9:
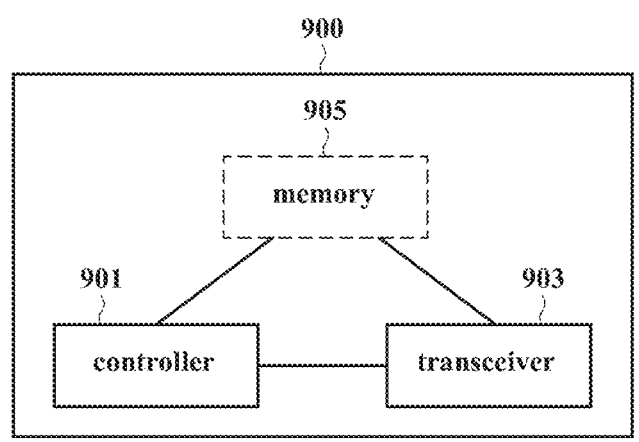

FIG. 9 is a block diagram of a mobile terminal, according to an example embodiment.

DETAILED DESCRIPTION

The inventive concepts and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. Also, the various example embodiments described herein are not necessarily mutually exclusive, as some example embodiments can be combined with one or more other example embodiments to form new example embodiments.

The term "or" as used herein refers to a non-exclusive or, unless otherwise indicated. The examples used herein are intended merely to facilitate an understanding of ways in which the example embodiments are practiced and/or to enable those skilled in the art to practice the example embodiments. Accordingly, the examples should not be construed as limiting the scope of example embodiments.

Some example embodiments achieve methods implemented in a mobile terminal. The method includes receiving a first location identifier value included in broadcast system information from a communication network. Further, the method includes detecting a mismatch between the first location identifier value and a second location identifier value received from the communication network in a location update accept message. Further, the method includes incrementing value of a counter in response to the detected mismatch. Further, the method includes determining that the value of the counter reaches a desired (or alternatively, predefined) threshold. The desired (or alternatively, predefined) threshold corresponds to maximum number of mismatches between the first location identifier value and the second location identifier value. Furthermore, the method includes updating the first location identifier in a subscriber identity module (SIM).

Unlike the conventional methods and systems, the inventive concepts relate to methods reducing the resource wastage (e.g., signaling message resource) when a mismatch between location identity values occurs. The inventive concepts relate to methods reducing battery usage by avoiding repeated registration attempt procedures to the communication network. The inventive concepts relate to methods that recover MO call and MT call services after the mismatch of identities has occurred and avoid missing of paging during the repeated registration attempt procedures.

Referring now to the drawings, and more particularly to FIGS. 1 through 8, where similar reference characters denote corresponding features consistently throughout the figures, some example embodiments will be explained.

Figure 1:
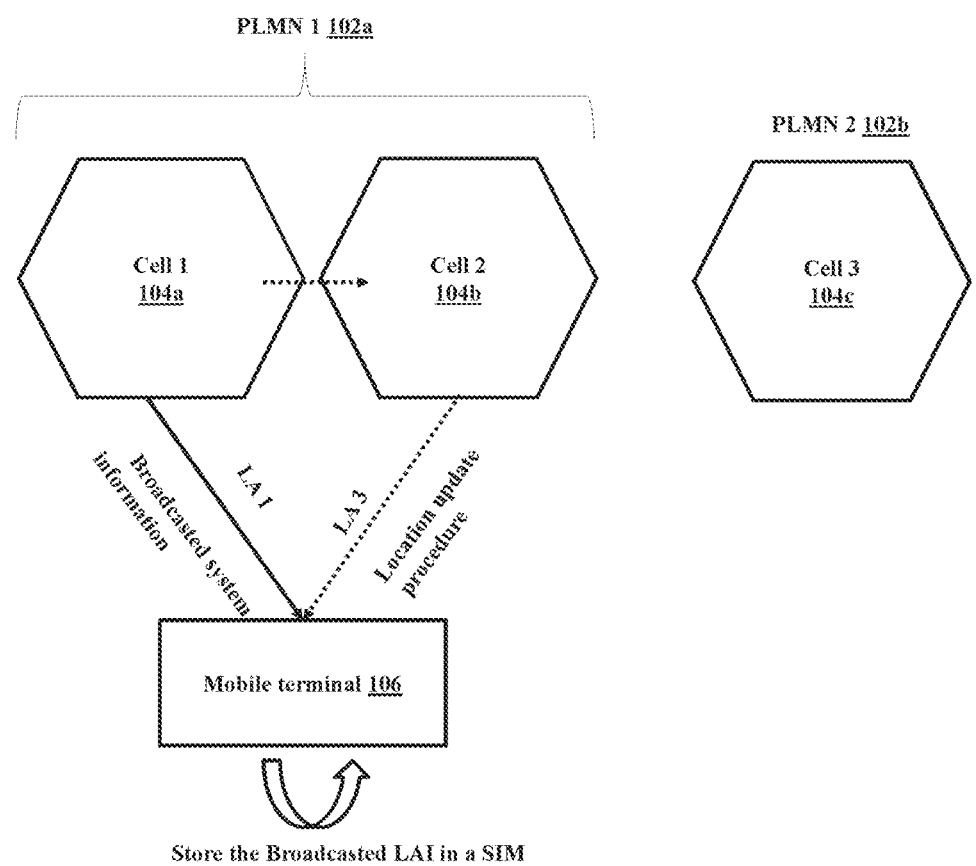
FIG. 1 illustrates a high level overview of a system for avoiding a resource wastage while detecting location identifier values mismatch, according to an example embodiments.

FIG. 1 illustrates a high level overview of a system for avoiding the resource wastage while detecting location identifier values mismatch, according to an example embodiments. The system includes a PLMN-1 102a, a PLMN-2 102b, a cell-1 104a, a cell-2 104b, a cell-3 104c, and a mobile terminal 106. The mobile terminal 106 can be, but not limited to, a cellular phone, a tablet, a smart phone, a laptop, a Personal Digital Assistant (PDA), a global positioning system, a multimedia device, or the like. The mobile terminal 106 can be a mobile station, a subscriber station, a UE, a mobile unit, a subscriber unit, a wireless unit, a remote unit, a mobile device, a wireless device, a wireless communications device, a mobile subscriber station, an access terminal, a wireless terminal, a remote terminal, a handset, a user agent, a mobile client, or the like. The mobile terminal 106 is compliant with multiple, different communication protocols that can operate as a multimode device by communicating within a fourth generation (4G) network employing any common type of Long Term Evolution (LTE) or LTE-Advanced (LTE-A) radio access technology (RAT), as well as within a third generation (3G) or second generation2G network employing any common type of legacy RAT. The mobile terminal 106 may include a memory configured to store computer-readable instructions, and one or more processors configured to execute the computer-readable instructions in communication with a communication network.

The mobile terminal 106 is configured to detect a mismatch between a first location identifier value and a second location identifier value. The first location identifier value may be received from the PLMN-1 102a in broadcasted system information. The second location identifier value may be received from the PLMN-1 102a during the location update procedure.

In some example embodiments, the first location identifier value and the second location identifier value may correspond to a Location Area Identifier (LAI).

In some example embodiments, the first location identifier value and the second location identifier value may correspond to a Routing Area Identifier (RAI).

In some example embodiments, the first location identifier value and the second location identifier value may correspond to a Tracking Area Identifier (TAI).

In response to detecting the mismatch between the first location identifier value and the second location identifier value, the mobile terminal 106 may be configured to increment a value of a counter. The counter can be referred to as an identity mismatch counter.

In some example embodiments, the initial value of the counter may be set by an original equipment manufacturer (OEM).

After incrementing the value of the counter, the mobile terminal 106 may be configured to determine that the value of the counter reaches a desired (or alternatively, predefined) threshold. In some example embodiments, the desired (or alternatively, predefined) threshold may correspond to a maximum number of mismatches between the first location identifier value and the second location identifier value. If the counter reaches the desired (or alternatively, predefined) threshold, the mobile terminal 106 may be configured to update the first location identifier in the SIM. If the counter does not reach the desired (or alternatively, predefined) threshold, the mobile terminal 106 may be configured to detect the mismatch between the first location identifier value and the second location identifier value again.

Actions performed at the mobile terminal 106 when the desired (or alternatively, predefined) threshold value of the counter is 1 is explained as follows.

The mobile terminal 106 may have LA1 as LAI, the mobile terminal 106 may detect the broadcasted LAI as LA2. Further, the mobile terminal 106 may send the location update request message to the PLMN 1 102a. In response, the PLMN 1 102a may send the location update accept message along with location identity (e.g., LA3). The mobile terminal 106 may detects the mismatch between the broadcasted LAI (e.g., LA2) and the LAI (e.g., LA3) received from the PLMN 1 102a in the location update accept message. The mobile terminal 106 may increment the value of the counter to 1. Further, the mobile terminal 106 may store the LA3 in the SIM. Further, the mobile terminal 106 may determine whether the value of the counter reaches the desired (or alternatively, predefined) threshold (e.g., 1). If the desired (or alternatively, predefined) threshold of the counter is reached, then the mobile terminal 106 may declare that there is a mismatch between the broadcasted LAI (e.g., LA2) and the LAI (e.g., LA3) received from the PLMN 1 102a, included in the location update accept message. Further, the mobile terminal 106 may store the broadcasted LAI (e.g., LA2) in the SIM. This result in stopping the LAI repeating process because the broadcasted LAI is stored as an updated LAI in the SIM.

Actions performed at the mobile terminal 106 when the desired (or alternatively, predefined) threshold value of the counter is 2 is explained as follows.

The mobile terminal 106 may have LA1 as LAI, the mobile terminal 106 may detect the broadcasted LAI as LA2. Further, the mobile terminal 106 may send the location update request message to the PLMN 1 102a. In response, the PLMN 1 102a may send the location update accept message along with location identity (e.g., LA3). The mobile terminal 106 may detect the mismatch between the broadcasted LAI (e.g., LA2) and the LAI (e.g., LA3) received from the PLMN 1 102a in the location update accept message. The mobile terminal 106 may increment the value of the counter to 1. The mobile terminal 106 stores the LA3 as an updated LAI in the SIM.

Further, the mobile terminal 106 may determine whether the value of the counter reaches the desired (or alternatively, predefined) threshold (e.g., 2). If the desired (or alternatively, predefined) threshold value of the counter is not reached, then the mobile terminal 106 may move to an idle mode and identify the broadcasted LAI (e.g., LA2) after the RR connection of the mobile terminal is released. Further, the mobile terminal 106 may send the location update request to the PLMN 1 102a and the PLMN 1 102a may send the location update accept message along with location identity (e.g., LA3). Further, the mobile terminal 106 may detect the mismatch between the broadcasted LAI (e.g., LA2) and the LAI (e.g., LA3) received from the PLMN 1 102a, included in the location update accept message. The mobile terminal 106 may increment the value of the counter to 2. The mobile terminal 106 may identify that the value of the counter reached the desired (or alternatively, predefined) threshold (e.g., 2). If the desired (or alternatively, predefined) threshold value of the counter is 2, then the mobile terminal 106 may declare that there is mismatch between the broadcasted LAI (e.g., LA2) and the LAI e.g., LA3) received from the PLMN 1 102a, included in the location update accept message. Further, the mobile terminal 106 may update the LAI value in the SIM with the broadcasted LAI (e.g., LA2). This results in stopping the LAI repeating process.

In some example embodiments, updating the identifier value in the SIM may correspond to replacing the stored second location identifier value in the SIM after incrementing the value of the counter.

In some example embodiments, updating the identifier value in the SIM may correspond to storing first identifier value in the SIM when the desired (or alternatively, predefined) threshold is unity.

In some example embodiments, along with incrementing value of the counter and prior to storing the location identifier received from the PLMN-1 102a in the SIM, the mobile terminal 106 may be configured to determine that the second location identifier is present in a forbidden location identifier list and avoid removal of the second location identifier from the forbidden location identifiers list.

In some example embodiments, along with incrementing the value of the counter and prior to storing the location identifier received from the PLMN-1 102a in the SIM, the mobile terminal 106 may be configured to determine that the second location identifier is present in a forbidden PLMN list and avoid removal of the second location identifier in the forbidden PLMN list.

In some example embodiment, prior to determining that the value of the counter reaches the desired (or alternatively, predefined) threshold, the mobile terminal 106 may be configured to detect a power off event and adaptively store the first location identifier in the SIM.

Figure 2:
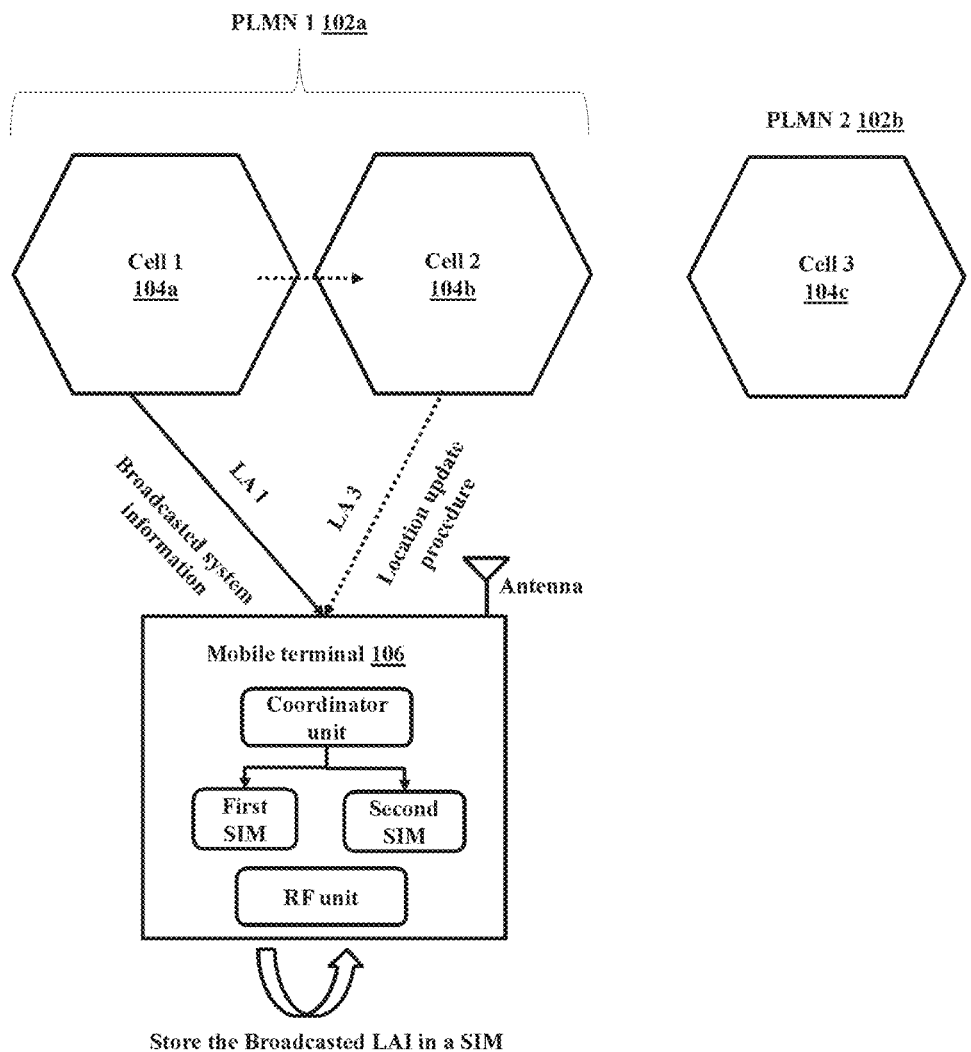
FIG. 2 illustrates a high level overview of a system for avoiding a resource wastage while detecting location identifier values mismatch in the case that a mobile terminal includes multiple SIMs, according to an example embodiment.

FIG. 2 illustrates a high level overview of a system for avoiding the resource wastage while detecting location identifier values mismatch in the case that the mobile terminal 106 includes multiple SIMs, according to an example embodiment. As shown in the FIG. 2, operations and functions of the system are similar to the system of FIG. 1. Further, the mobile terminal 106 includes multiple SIMs (i.e., first SIM and second SIM), an antenna, a Radio Frequency (RF) unit, and a coordinator unit. The coordinator unit may coordinate a signal between the multiple SIMs. The first SIM may perform a registration procedure to the PLMN 1 102a. After the first SIM performing the registration procedure to the PLMN 1 102a, the second SIM may perform a registration procedure to the PLMN 1 102a. After performing the registration procedures, the remaining processes according to the specification can be continuously performed.

Although FIG. 2 illustrates that the second SIM performs the registration procedure to a same communication network of first SIM, it will be understood by a person of ordinary skill in the art that the second SIM may perform the registration procedure to a different communication network.

FIG. 1 and FIG. 2 merely show high level overviews of the system, respectively, and thus example embodiments are not limited thereto. Further, the system can include any number of hardware or software components communicating with each other. For example, the component can be, but not limited to, software, object code, program running in the controller or processor, a thread of execution, a program, or a computer.

Figure 3:
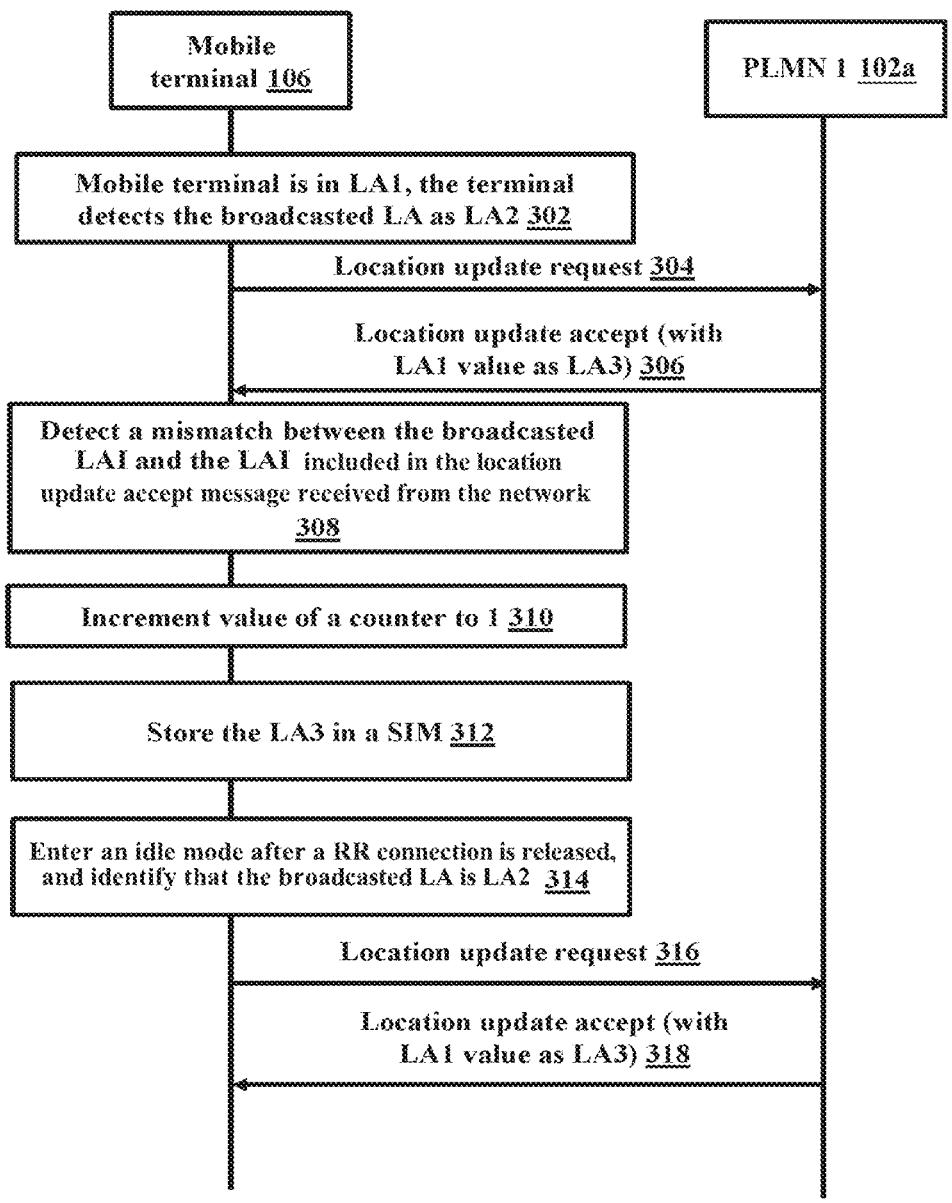
FIG. 3 is a sequence diagram illustrating an operation in a procedure for avoiding the resource wastage when mismatch in location identifier values is detected, according to an example embodiment.
Figure 3:
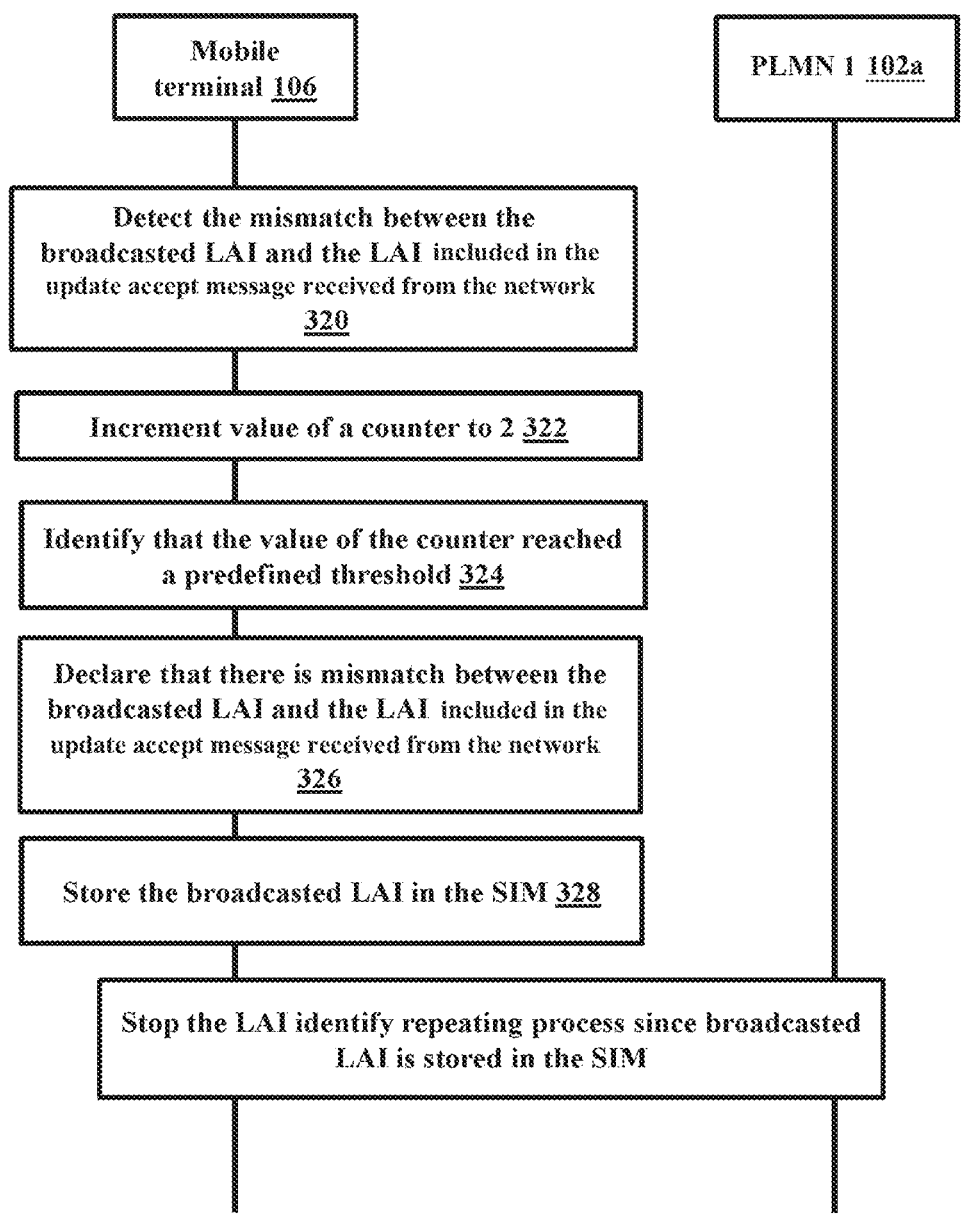

FIG. 3 is a sequence diagram illustrating an operation in a procedure for avoiding the resource wastage when a mismatch in location identifier values is detected, according to an example embodiment. At operation 302, the mobile terminal 106 is in LA1, the mobile terminal 106 detects the broadcasted LAI as LA2. At operation 304, the mobile terminal 106 sends the location update request to the PLMN 1 102a. At operation 306, the PLMN 1 102a sends the location update accept message along with location identity as LA3. At operation 308, the mobile terminal 106 detects the mismatch between the broadcasted LAI (e.g., LA2) and the LAI (e.g., LA3) received from the PLMN 1 102a, included in the location update accept message. At operation 310, the mobile terminal 106 increments the value of the counter to 1. At operation 312, the mobile terminal 106 stores the LA3 in the SIM. At operation 314, the mobile terminal 106 enters the idle mode and identifies the broadcasted LAI as LA2 after the RR connection of the mobile terminal 106 is released. At operation 316, the mobile terminal 106 sends the location update request to the PLMN 1 102a. At operation 318, the PLMN 1 102a sends the location update accept message along with location identity as LA3.

At operation 320, the mobile terminal 106 detects the mismatch between the broadcasted LAI (e.g., LA2) and the LAI (e.g., LA3) received from the PLMN 1 102a, included in the location update accept message. At operation 322, the mobile terminal 106 increments value of the counter to 2. At operation 324, the mobile terminal 106 identifies that the value of the counter reached the desired (or alternatively, predefined) threshold. At operation 326, the mobile terminal 106 declares that there is a mismatch between the broadcasted LAI (i.e., LA2) and the LAI (i.e., LA3) received from the PLMN 1 102a, included in the location update accept message. At operation 328, the mobile terminal 106 stores the broadcasted LAI (e.g., LA2) in the SIM. Further, the mobile terminal 106 stops the LAI identification iteration because the broadcasted LAI is stored as an updated LAI in the SIM.

Figure 4:
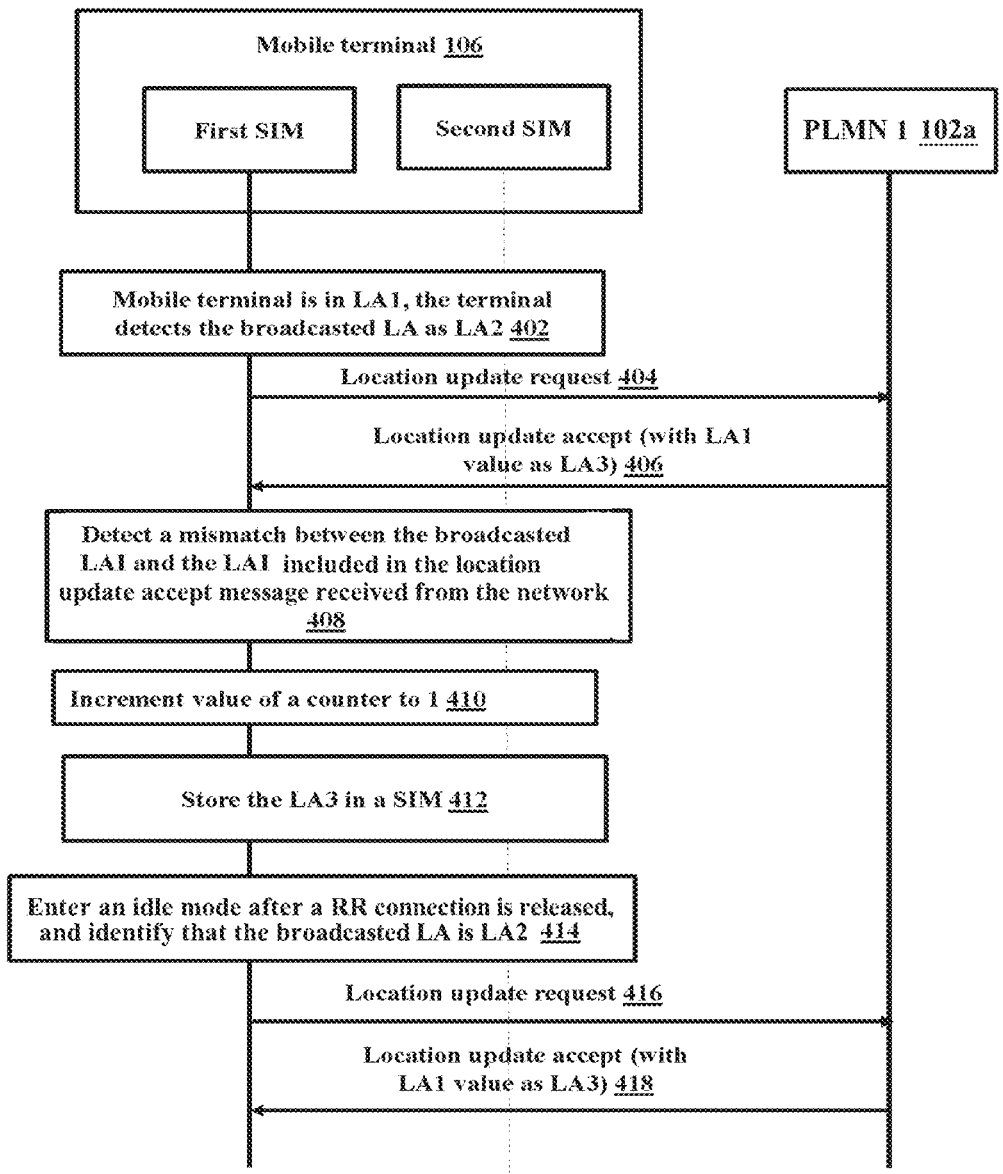
FIG. 4 is a sequence diagram illustrating an operation in a procedure for avoiding the resource wastage when mismatch in location identifier values is detected, in the case that a mobile terminal includes multiple SIMs, according to an example embodiment.
Figure 4:
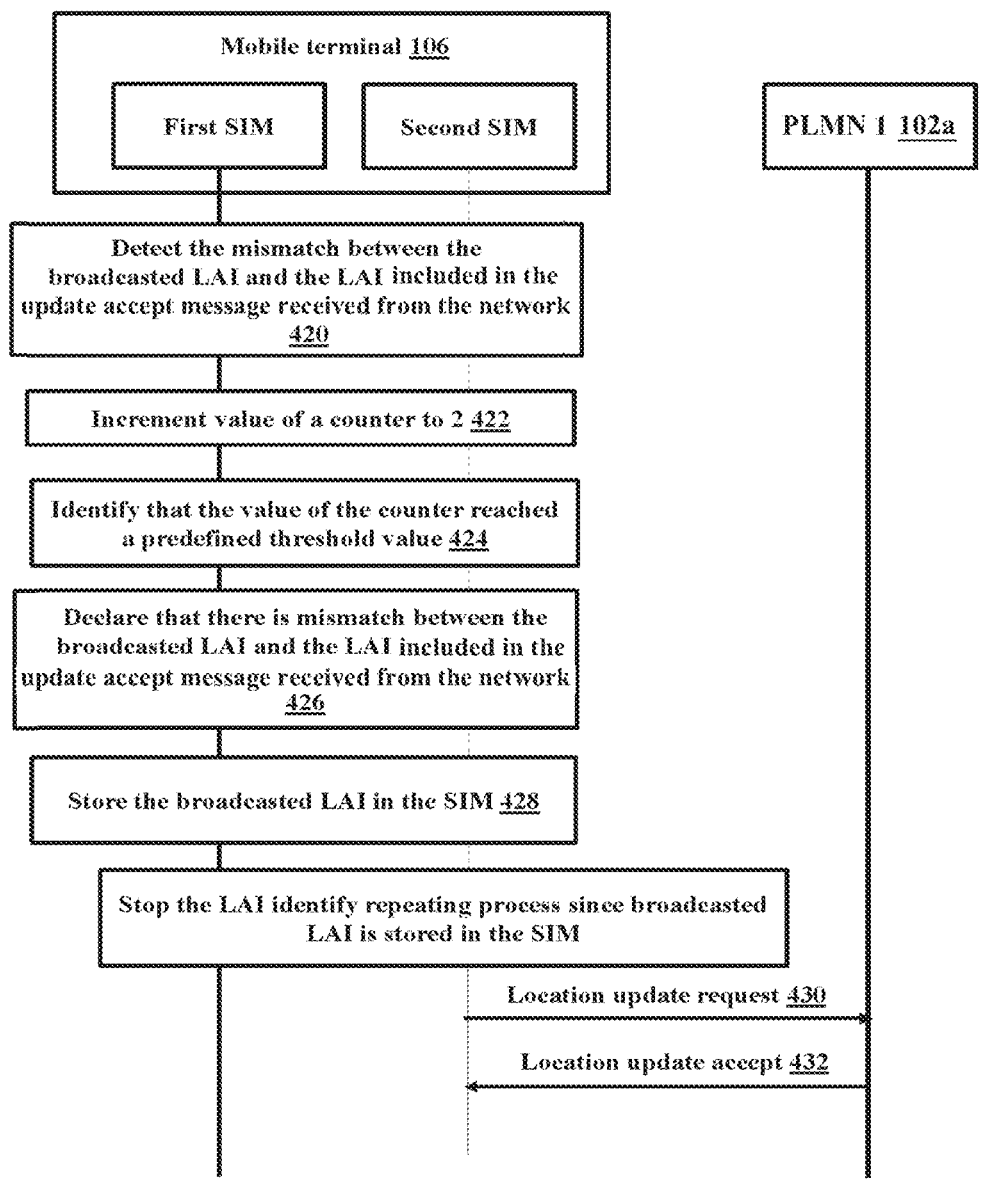

FIG. 4 is a sequence diagram illustrating an operation in a procedure for avoiding the resource wastage when a mismatch in the location identifier values is detected, in the case that the mobile terminal 106 includes multiple SIMs, according to an example embodiment. At operation 402, the mobile terminal 106 associated with the first SIM is in the LA1, the mobile terminal 106 associated with the first SIM detects the broadcasted LA as LA2. At operation 404, the mobile terminal 106 associated with the first SIM sends the location update request to the PLMN 1 102a. At operation 406, the PLMN 1 102a sends the location update accept message along with location identity as LA3 to the mobile terminal 106. At operation 408, the mobile terminal 106 associated with the first SIM detects the mismatch between the broadcasted LAI (e.g., LA2) and the LAI (e.g., LA3) included in the location update accept message received from the PLMN 1 102a. At operation 410, the mobile terminal 106 increments the value of the counter to 1. At operation 412, the mobile terminal 106 stores the LA3 as an updated LAI in the first SIM. At operation 414, the mobile terminal 106 enters an idle mode and identifies the broadcasted LAI as LA2 after the RR connection of the mobile terminal 106 is released. At operation 416, the mobile terminal 106 associated with the first SIM sends the location update request to the PLMN 1 102a. At operation 418, the PLMN 1 102a sends the location update accept message along with location identity as LA3 to the mobile terminal 106.

At operation 420, the mobile terminal 106 associated with the first SIM detects the mismatch between the broadcasted LAI (e.g., LA2) and the LAI (e.g., LA3) received from the PLMN 1 102a, included in the location update accept message. At operation 422, the mobile terminal 106 increments value of the counter to 2. At operation 424, the mobile terminal 106 identifies that the value of the counter reached the desired (or alternatively, predefined) threshold. At operation 426, the mobile terminal 106 declares that there is a mismatch between the broadcasted LAI (e.g., LA2) and the LAI (e.g., LA3) included in the location update accept message received from the PLMN 1 102a. At operation 428, the mobile terminal 106 stores the broadcasted LAI (e.g., LA2) as an updated LAI in the first SIM. Further, the mobile terminal 106 stops the LAI identification iteration because the broadcasted LAI (e.g., LA2) is stored in the first SIM.

At operation 430, the mobile terminal 106 associated with the second SIM sends the location update request to the PLMN 1 102a. At operation 434, the PLMN 1 102a sends the location update accept message along with the location identity to the mobile terminal 106. After receiving the location update accept message from the PLMN 1 102a, the remaining processes according to the specification may be continuously performed.

Here the second SIM associated with the mobile terminal 106 performs the location update request to a same operator network of the first SIM. However, it will be understood by a the person of ordinary skill in the art that the second SIM associated with the mobile terminal 106 may perform the location update request to another network.

Figure 5:
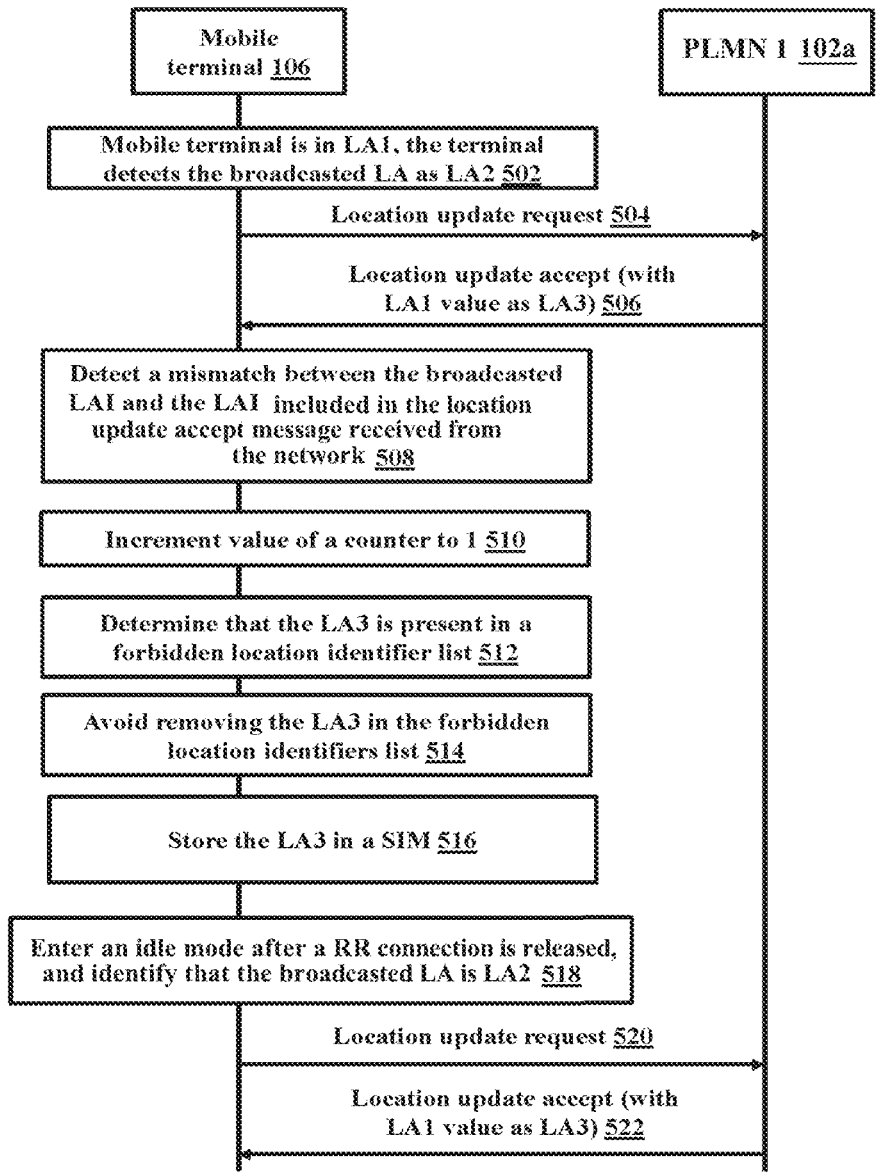
FIG. 5 is a sequence diagram illustrating an operation in ab procedure for avoiding the resource wastage when mismatch in the location identifier values is detected and a mobile terminal determines that a location identifier value is present in a forbidden location identifier list, according to an example embodiment.
Figure 5:
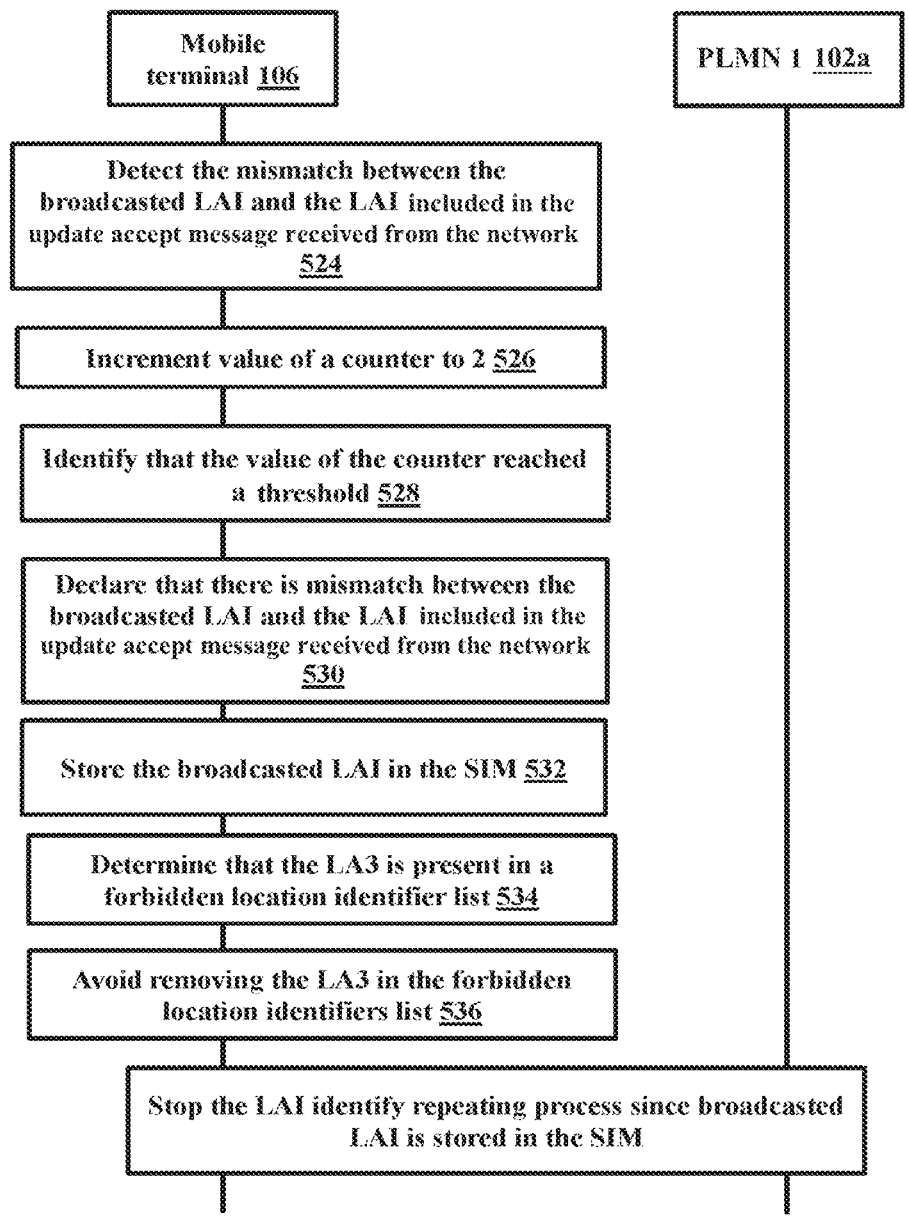

FIG. 5 is a sequence diagram illustrating an operation in a procedure for avoiding the resource wastage when a mismatch in the location identifier values is detected and the mobile terminal 106 determines that the location area identifier value is present in the forbidden location identifier list, according to an example embodiment. At operation 502, the mobile terminal 106 is in LA1, the mobile terminal 106 detects the broadcasted LAI as LA2. At operation 504, the mobile terminal 106 sends the location update request to the PLMN 1 102a. At operation 506, the PLMN 1 102a sends the location update accept message along with the location identity as LA3 to the mobile terminal 106. At operation 508, the mobile terminal 106 detects the mismatch between the broadcasted LAI (e.g., LA2) and the LAI (e.g., LA3) included in the location update accept message received through the PLMN 1 102a. At operation 510, the mobile terminal 106 increments the value of the counter to 1.

At operation 512, the mobile terminal 106 determines that the LA3 is present in the forbidden location identifier list. At operation 512, the mobile terminal 106 avoids removal of the LA3 in the forbidden location identifiers list. At operation 516, the mobile terminal 106 stores the LA3 as an updated LAI value in the SIM. At operation 518, the mobile terminal 106 enters the idle state and identifies the broadcasted LAI as LA2 after the RR connection of the mobile terminal 106 is released. At operation 520, the mobile terminal 106 sends the location update request to the PLMN 1 102a. At operation 522, the PLMN 1 102a sends the location update accept message along with the location identity as LA3 to the mobile terminal 106.

At operation 524, the mobile terminal 106 detects the mismatch between the broadcasted LAI (e.g., LA2) and the LAI (e.g., LA3) included in the location update accept message received from the PLMN 1 102a. At operation 526, the mobile terminal 106 increments value of the counter to 2. At operation 528, the mobile terminal 106 identifies that the value of the counter reached the desired (or alternatively, predefined) threshold. At operation 530, the mobile terminal 106 declares that there is a mismatch between the broadcasted LAI (e.g., LA2) and the LAI (e.g., LA3) included in the location update accept message received from the PLMN 1 102a. At operation 532, the mobile terminal 106 stores the broadcasted LAI (e.g., LA2) as an updated LAI value in the SIM. At operation 534, the mobile terminal 106 determines that the LA3 is present in the forbidden location identifier list. At operation 536, the mobile terminal 106 avoids removal of the LA3 in the forbidden location identifiers list. Further, the mobile terminal 106 stops the LAI identification iteration because the broadcasted LAI is stored in the SIM.

Figure 6:
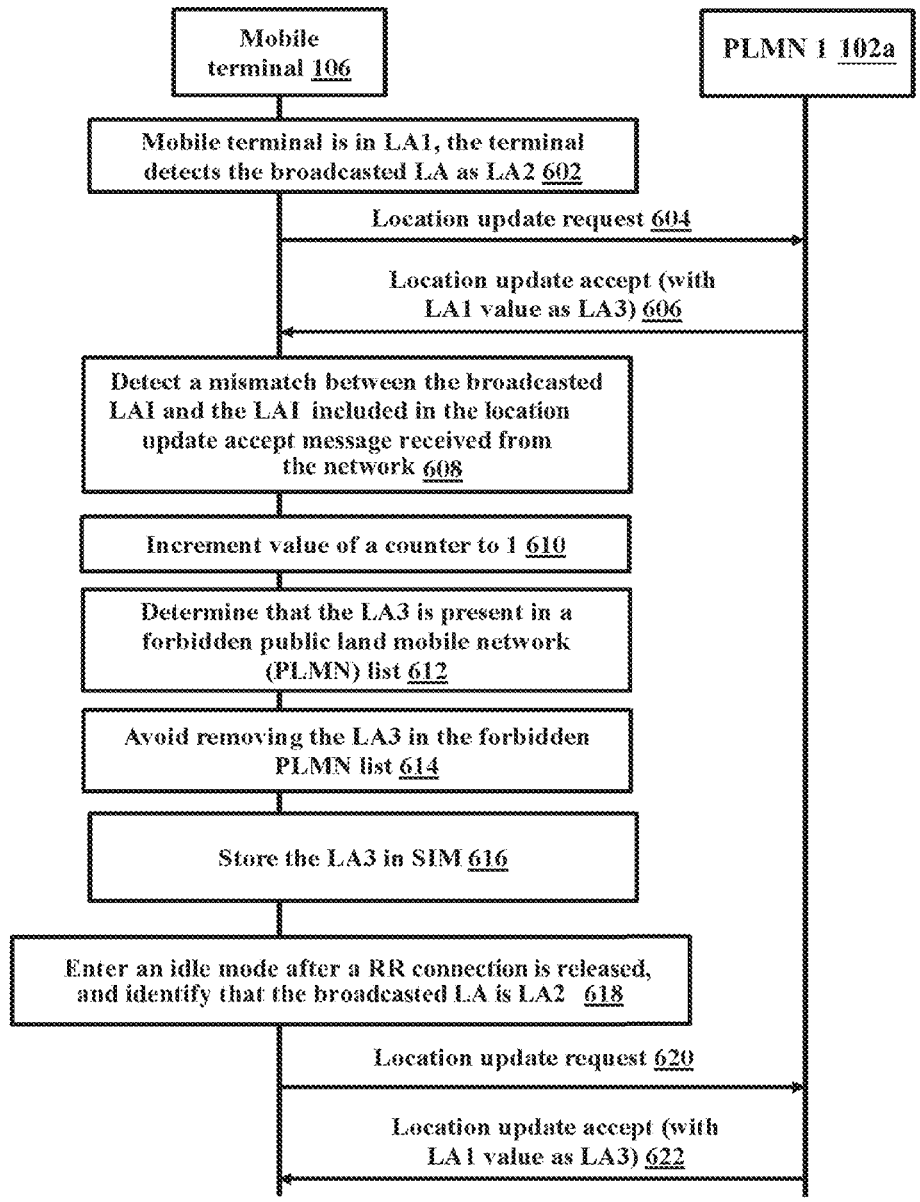
FIG. 6 is a sequence diagram illustrating an operation in a procedure for avoiding the resource wastage when mismatch in the location identifier values is detected and the mobile terminal determines that a location area identifier value is present in a forbidden PLMN list, according to an example embodiment.
Figure 6:
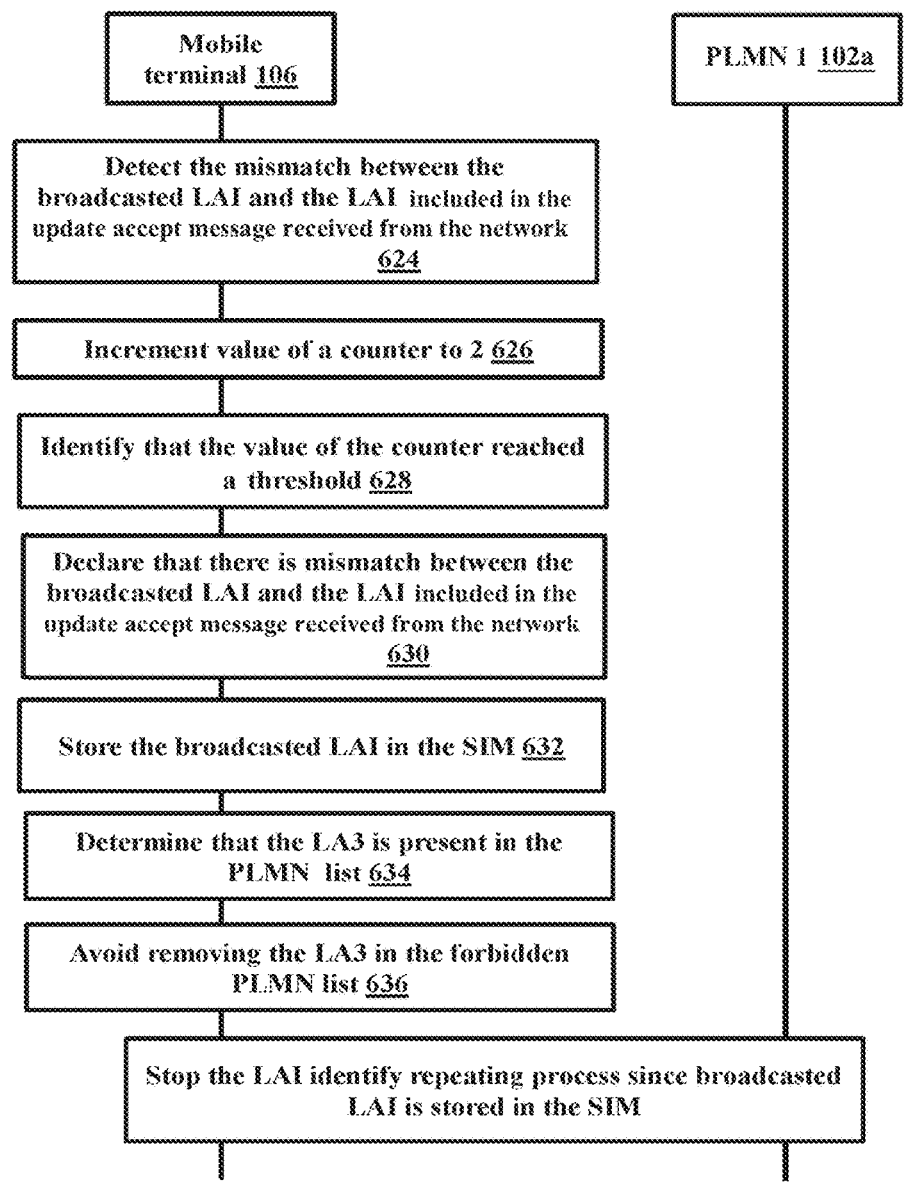

FIG. 6 is a sequence diagram illustrating an operation in a procedure for avoiding the resource wastage when a mismatch in the location identifier values is detected and the mobile terminal 106 determines that the location area identifier value is present in the forbidden PLMN list, according to an example embodiment. At operation 602, the mobile terminal 106 is in the LA1, the mobile terminal 106 detects the broadcasted LAI as LA2. At operation 604, the mobile terminal 106 sends the location update request message to the PLMN 1 102a. At operation 606, the PLMN 1 102a sends the location update accept message along with the location identity as LA3 to the mobile terminal 106. At operation 608, the mobile terminal 106 detects the mismatch between the broadcasted LAI (e.g., LA2) and the LAI (e.g., LA3) included in the location update accept message received from the PLMN 1 102a. At operation 610, the mobile terminal 106 increments the value of the counter to 1.

At operation 612, the mobile terminal 106 determines that the LA3 is present in the forbidden PLMN list. At operation 612, the mobile terminal 106 avoids removal of the LA3 in the forbidden PLMN list. At operation 616, the mobile terminal 106 stores the LA3 as an updated LAI value in the SIM. At operation 618, the mobile terminal 106 enters the idle state and identifies the broadcasted LAI as LA2 after the RR connection of the mobile terminal 106 is released. At operation 620, the mobile terminal 106 sends the location update request message to the PLMN 1 102a. At operation 622, the PLMN 1 102a sends the location update accept message along with the location identity as LA3 to the mobile terminal 106.

At operation 624, the mobile terminal 106 detects the mismatch between the broadcasted LAI (e.g., LA2) and the LAI (e.g., LA3) included in the location update accept message received from the PLMN 1 102a. At operation 626, the mobile terminal 106 increments value of the counter to 2. At operation 628, the mobile terminal 106 identifies that the value of the counter reached the desired (or alternatively, predefined) threshold. At operation 630, the mobile terminal 106 declares that there is a mismatch between the broadcasted LAI (e.g., LA2) and the LAI (e.g., LA3) included in the location update accept message received from the PLMN 1 102a. At operation 632, the mobile terminal 106 stores the broadcasted LAI (e.g., LA2) as an updated LAI value in the SIM. At operation 634, the mobile terminal 106 determines that the LA3 is present in the PLMN list. At operation 636, the mobile terminal 106 avoids removal of the LA3 in the forbidden PLMN list. Further, the mobile terminal 106 stops the LAI identification iteration because the broadcasted LAI is stored in the SIM.

FIG. 7 is a sequence diagram illustrating an operation in a procedure for avoiding the resource wastage when a mismatch in location identifier values is detected and the mobile terminal 106 detects the power off event prior to determining that the value of the counter reaches the desired (or alternatively, predefined) threshold, according to an example embodiment. At operation 702, the mobile terminal 106 is in the LA1, the mobile terminal 106 detects the broadcasted LAI as LA2. At operation 704, the mobile terminal 106 sends the location update request message to the PLMN 1 102a. At operation 706, the PLMN 1 102a sends the location update accept message along with location identity as LA3 to the mobile terminal 106. At operation 708, the mobile terminal 106 detects the mismatch between the broadcasted LAI (e.g., LA2) and the LAI (e.g., LA3) included in the location update accept message received from the PLMN 1 102a. At operation 710, the mobile terminal 106 increments the value of the counter to 1. At operation 712, the mobile terminal 106 determines that the value of the counter reaches the desired (or alternatively, predefined) threshold. At operation 714, the mobile terminal 106 detects the power off event. At operation 716, the mobile terminal 106 stores the LA3 as an updated LAI value in the SIM.

FIG. 8 is a flow diagram illustrating a method for avoiding the resource wastage when a mismatch in location identifier values is detected, according to an example embodiment. The operations (802 to 808) may be performed by a processor (e.g., microprocessor, microcontroller or the like). At operation 802, the method includes detecting the mismatch between the first location identifier value and the second location identifier value. The first location identifier value may be included in the broadcasted system information received from the PLMN 1 102a.

The second location identifier value may be included in a location update procedure received from the PLMN 1 102a.

In some example embodiments, the first location identifier value and the second location identifier value may correspond to the LAI.

In some example embodiments, the first location identifier value and the second location identifier value may correspond to the RAI.

In some example embodiments, the first location identifier value and the second location identifier value may correspond to the TAI.

At operation 804, the value of the counter is incremented in response to the detected mismatch. If the mismatch is not detected, the method is performed according to the specification. At operation 806, the method includes determining that the value of the counter reaches the desired (or alternatively, predefined) threshold. In some example embodiments, the desired (or alternatively, predefined) threshold may correspond to maximum number of mismatches between the first location identifier value and the second location identifier value. At operation 808, a location identifier (e.g., the first location identifier) in the SIM is updates. In some example embodiments, updating the identifier value in the SIM may correspond to replacing the stored second location identifier value in the SIM after incrementing value of the counter.

In some example embodiments, updating the first identifier value in the SIM may correspond to storing the first identifier value in the SIM when the desired (or alternatively, predefined) threshold is 1.

The proposed method may be applicable to all registration procedures and identities irrespective of the Radio Access Technology (RAT) (e.g., TAI mismatch, RAI mismatch, LAI mismatch during TAU, RAU, ATTACH, or LAU normal and combined procedures).

The various actions, acts, blocks, operations, and the like in the method may be performed in the order presented, in a different order or simultaneously. Further, in some example embodiments, some actions, acts, blocks, operations, and/or the like may be omitted, added, modified, or skipped without departing from the scope of the invention.

FIG. 9 is a block diagram of a mobile terminal (900), according to an example embodiment. The mobile terminal 900 comprises a controller 901 and a transceiver 903. Also the mobile terminal 900 may comprise a memory 905. The controller 901 may be a processor.

The mobile terminal 900 according to an embodiment of the present disclosure is a device that receive a first location identifier value included in broadcast system information from the communication network, detect at least one of mismatch between the first location identifier value and a second location identifier value, the second location identifier value included in a location update accept message received from the communication network, increment a value of a counter based on the detected at least one of mismatch, determine that the value of the counter reaches a threshold, the threshold corresponds being a maximum number of the detected at least one mismatch between the first location identifier value and the second location identifier value, and update the first location identifier in a subscriber identity module.

It may be construed that the controller 901 controls all of the operations described herein to be performed by the mobile terminal.

Although the controller 901, the transceiver 903, and the memory 905 are illustrated as separate components in FIG. 9, the controller 901, the transceiver 903, and the memory 905 may be implemented as one component.

The example embodiments disclosed herein can be implemented through at least one software program running on at least one hardware device and by performing network management functions to control the elements. The elements shown in the FIGS. 1 through 8 include blocks which can be at least one of a hardware device, or a combination of hardware device and software module.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method implemented by a processor included in a mobile terminal, which is configured to communicate with a mobile network, the method comprising:
   receiving a first location identifier value included in system information from the mobile network;
   detecting a mismatch between the first location identifier value and a second location identifier value, the second location identifier value included in a location update accept message received from the mobile network;
   incrementing a value of a counter based on the detected mismatch;
   determining that the value of the counter reaches a threshold, the threshold being a maximum number of the detected mismatch between the first location identifier value and the second location identifier value; and
   updating the first location identifier value in a Subscriber Identity Module (SIM).

2. The method of claim 1, further comprising:
   along with the incrementing the value of the counter and storing at least one of the first location identifier value or the second location identifier value received from the mobile network in the SIM,
   determining, by the processor, that the second location identifier value is present in one of a forbidden location identifier list or a forbidden Public Land Mobile Network (PLMN) list; and
   maintaining, by the processor, the second location identifier value from the one of the forbidden location identifiers list or the forbidden PLMN list.

3. The method of claim 1, further comprising:
   prior to determining that the value of the counter reaches the threshold,
   detecting, by the processor, a power off event; and
   adaptively storing, by the processor, the first location identifier value in the SIM.

4. The method of claim 1, wherein the updating the first location identifier value in the SIM includes replacing the first location identifier value in the SIM with the second location identifier value after the incrementing the value of the counter.

5. The method of claim 1, wherein the updating the first location identifier value in the SIM includes storing the first location identifier value in the SIM when the threshold is 1.

6. The method of claim 1, wherein the mobile terminal includes a first SIM and a second SIM, and the SIM is the first SIM.

7. The method of claim 1, wherein each of the first location identifier value and the second location identifier value is one of a Location Area Identifier (LAI), a Routing Area Identifier (RAI), or a Tracking Area Identifier (TAI).

8. A mobile terminal comprising:
   a memory configured to store computer-readable instructions; and one or more processors configured to execute the computer-readable instructions in communication with a communication network such that the one or more processors are configured to, receive a first location identifier value included in broadcast system information from the communication network, detect a mismatch between the first location identifier value and a second location identifier value, the second location identifier value included in a location update accept message received from the communication network, increment a value of a counter based on the detected mismatch, determine that the value of the counter reaches a threshold, the threshold corresponds being a maximum number of the detected mismatch between the first location identifier value and the second location identifier value, and update the first location identifier in a Subscriber Identity Module (SIM).

9. The mobile terminal of claim 8, the one or more processors are further configured to:

determine that the second location identifier value is present in one of a forbidden location identifier list or a forbidden Public Land Mobile Network (PLMN) list; and maintain the second location identifier value in the one of the forbidden location identifiers list or the forbidden PLMN list.

10. The mobile terminal of claim 8, wherein before the one or more processors determine that the value of the counter reaches the threshold, the one or more processors are further configured to:

detect a power off event; and adaptively store the first location identifier in the SIM.

11. The mobile terminal of claim 8 wherein the one or more processors are further configured to update the first location identifier value in the SIM by replacing the first location identifier value in the SIM with the second location identifier value after the one or more processors increment the value of the counter.

12. The mobile terminal of claim 8, wherein the one or more processor are configured to update the first location identifier value in the SIM by storing the first location identifier value in the SIM when the threshold is 1.

13. The mobile terminal of claim 8 including a first SIM and a second SIM, and the SIM being the first SIM.

14. The mobile terminal of claim 8, wherein each of the first location identifier value and the second location identifier value is one of a Location Area Identifier (LAI), a Routing Area Identifier (RAI), or a Tracking Area Identifier (TAI).

15. A method for a location area identity (LAI) identification implemented by a processor included in a mobile terminal, which is configured to communicate with a communication network, the method comprising:

receiving, by the processor, a first location identifier value in broadcast system information from the communication network;

sending, by the processor, a location update request message to the communication network;

receiving, by the processor, a location update accept message from the communication network, the location update accept message including a second location identifier value;

detecting, by the processor, a first mismatch between the first location identifier value and the second location identifier value;

incrementing, by the processor, a first value of a counter based on the first mismatch; and updating, by the processor, a location identifier value in a Subscriber Identity Module (SIM) with the second location identifier value.

16. The method of claim 15, further comprising:

after the incrementing a first value of a counter, determining, by the processor, that the second location identifier value is present in one of a forbidden location identifier list or a forbidden Public Land Mobile Network (PLMN) list; and maintaining, by the processor, the second location identifier value from the one of the forbidden location identifiers list or the forbidden PLMN list.

17. The method of claim 15, further comprising:

after the updating a second location identifier value in the SIM, entering, by the processor, an idle mode after a Radio Resource (RR) connection of the mobile terminal is released.

18. The method of claim 17, further comprising:

after entering an idle mode, sending, by the processor, a location update request message to the communication network;

receiving, by the processor, a location update accept message from the communication network, the location update accept message including a third location identifier value; and detecting, by the processor, a second mismatch between the first location identifier value and the third location identifier value.

19. The method of claim 18, further comprising:

after the detecting the second mismatch, incrementing, by the processor, the first value of a counter by 1 based on the second mismatch;

determine, by the processor, that the first value of the counter reaches a threshold;

declaring, by the processor, that the second mismatch has occurred; and updating, by the processor, the location identifier value in the SIM with the first location identifier value.

20. The method of claim 19, further comprising:

after the updating the location identifier value in the SIM with the first location identifier value, stopping, by the processor, operations associated with the LAI identification.

* * * * *